United States Patent
Yang et al.

(10) Patent No.: US 11,347,623 B1
(45) Date of Patent: May 31, 2022

(54) AUTOMATED DEFECT TYPE BASED LOGGING INTEGRATION WITHIN SOURCE CODE

(71) Applicant: International Business Machines Corporation, Armonk, NY (US)

(72) Inventors: Bo Yang, Beijing (CN); Shiwan Zhao, Beijing (CN); HongLei Guo, Beijing (CN); Zhong Su, Beijing (CN); Jim Alain Laredo, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/137,717

(22) Filed: Dec. 30, 2020

(51) Int. Cl.
*G06F 8/30* (2018.01)
*G06F 8/71* (2018.01)
*G06F 40/205* (2020.01)
*G06F 11/36* (2006.01)

(52) U.S. Cl.
CPC ............ *G06F 11/3624* (2013.01); *G06F 8/30* (2013.01); *G06F 8/71* (2013.01); *G06F 40/205* (2020.01)

(58) Field of Classification Search
CPC .......... G06F 8/30; G06F 8/71; G06F 11/3624; G06F 40/205
USPC ....................................................... 717/110
See application file for complete search history.

(56) References Cited

U.S. PATENT DOCUMENTS

| 10,891,297 B2* | 1/2021 | Zhu et al. ............. G06F 40/205 |
| 2005/0015668 A1* | 1/2005 | Doyle et al. ......... G06F 11/0706 714/25 |
| 2011/0258609 A1 | 10/2011 | Maczuba |
| 2014/0249804 A1* | 9/2014 | Jackson ................ G06F 40/205 704/9 |
| 2020/0050660 A1* | 2/2020 | Postniece et al. .... G06F 40/205 |

OTHER PUBLICATIONS

Yuan et al., Be Conservative: Enhancing Failure Diagnosis with Proactive Logging, 10th USENIX Symposium on Operating Systems Design and Implementation (OSDI '12), Oct. 2012.

(Continued)

*Primary Examiner* — Wei Y Zhen
*Assistant Examiner* — Mohammed N Huda
(74) *Attorney, Agent, or Firm* — Garg Law Firm, PLLC; Rakesh Garg; Joseph Petrokaitis

(57) ABSTRACT

Using a natural language processing model, a historical defect report comprising a defect description in narrative text form is parsed. Within a code repository, source code associated with the historical defect report is identified. From the historical defect report and the source code, a logging rule comprising a defect type, logging placement information corresponding to the defect type, and logging format information corresponding to the defect type is generated. By parsing a new defect report using the natural language processing model, the new defect report reporting a defect in new source code, it is determined that the logging rule applies to the new defect report. Logging source code generating logging output when executed is placed within the new source code according to the logging rule. Execution of the new source code including the logging source code is caused, generating the logging output.

20 Claims, 9 Drawing Sheets

(56) References Cited

OTHER PUBLICATIONS

Yuan et al., Improving software diagnosability via log enhancement, ACM Transactions on Computer Systems, vol. 30, No. 1, Article 4, Feb. 2012.
Fu et al., Execution Anomaly Detection in Distributed Systems through Unstructured Log Analysis, Dec. 28, 2009.
Whitmore, Auto-Instrument Your Framework, Nov. 1, 2019, https://docs.lightstep.com/docs/auto-instrument-your-framework.
Sourceforge, Hookit—Callflow for C/C++ for Linux, 2020, http://perfinsp.sourceforge.net/hookit_linux.html.
PostSharp, PostSharp, https://www.postsharp.net/logging, 2020.
Precub, Guide to Java Instrumentation, Dec. 31, 2019, https://www.baeldung.com/java-instrumentation.
Wikipedia, Log analysis, Mar. 16, 2020, https://en.wikipedia.org/wiki/Log_analysis.

\* cited by examiner

AUTOMATED DEFECT TYPE BASED LOGGING INTEGRATION WITHIN SOURCE CODE

BACKGROUND

The present invention relates generally to a method, system, and computer program product for software log generation. More particularly, the present invention relates to a method, system, and computer program product for automated defect type based logging integration within source code.

A log is a record, generally in order of occurrence, of events or software states. Software such as operating systems, applications, server and client software, and device firmware often generates logs, for use in software development, testing, and in analyzing and fixing software defects such as bugs and security vulnerabilities.

The illustrative embodiments recognize that some production versions of software generate logs as part of normal operation. Code to generate logging data is often generated automatically, for example at every function entry. However, log entry content and format are not consistent across applications. For example, different applications might label user authentication-related logging using "authentication", "user validation", and "login". In addition, because the logs are generated during normal operation, the logged data is not specific to a particular software defect and often includes a large amount of extraneous data that must be analyzed and filtered out. Log format and content is often poorly documented.

The illustrative embodiments also recognize that human software developers often insert additional log data generating code into application source code to aid in analyzing software defects. The additional log data might include, for example, a record of which portions of the source code were executed in which sequence, and the values of various variables at particular execution points. However, a software developer engaged in analyzing and fixing a software defect may be unfamiliar with the source code of the software, requiring additional analysis, and often multiple rounds of trial and error, to determine where to insert log data generating code (also called logging code) and what log data to generate. In addition, the logging code a software developer inserts when analyzing a software defect is typically ad hoc, lacking a consistent log entry content and format. Some developers also remove such ad hoc logging code after the defect is resolved, so that a later developer analyzing a later defect in the same portion of code is not able to leverage the first developer's experience. Thus, the illustrative embodiments recognize that log data a previous developer used to analyze and fix a previous software defect is likely to be helpful in analyzing a similar defect.

Consequently, the illustrative embodiments recognize that there is an unmet need for a system that automatically integrates code to generate log data into application source code, based on a particular type of software defect.

SUMMARY

The illustrative embodiments provide a method, system, and computer program product. An embodiment includes a method that parses, using a natural language processing model, a historical defect report, the historical defect report comprising a defect description in narrative text form. An embodiment identifies, within a code repository, source code associated with the historical defect report. An embodiment generates, from the historical defect report and the source code, a logging rule, the logging rule comprising a defect type, logging placement information corresponding to the defect type, and logging format information corresponding to the defect type. An embodiment determines, by parsing a new defect report using the natural language processing model, the new defect report reporting a defect in new source code, that the logging rule applies to the new defect report. An embodiment places, within the new source code according to the logging rule, logging source code, the logging source code generating logging output when executed. An embodiment causes execution of the new source code including the logging source code, the execution generating the logging output. Thus an embodiment provides automated defect type based logging integration within source code.

In another embodiment, the source code associated with the historical defect report includes historical logging output generating source code. Thus, the embodiment generates a logging rule with reference to historical logging output generating source code.

Another embodiment further includes identifying, within the historical defect report, historical log data. Thus, the embodiment provides an alternative configuration that identifies historical log data.

Another embodiment further includes identifying, within the historical defect report, the defect type. Thus, the embodiment provides an alternative configuration that identifies the defect type.

Another embodiment further includes identifying, within text corresponding to the source code, the defect type, the text corresponding to the source code stored in the code repository in narrative text form. Thus, the embodiment provides an alternative configuration that identifies the defect type.

Another embodiment further includes integrating, for display, the new source code and the generated logging output. Thus, the embodiment provides an alternative configuration that integrates the new source code and the generated logging output.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
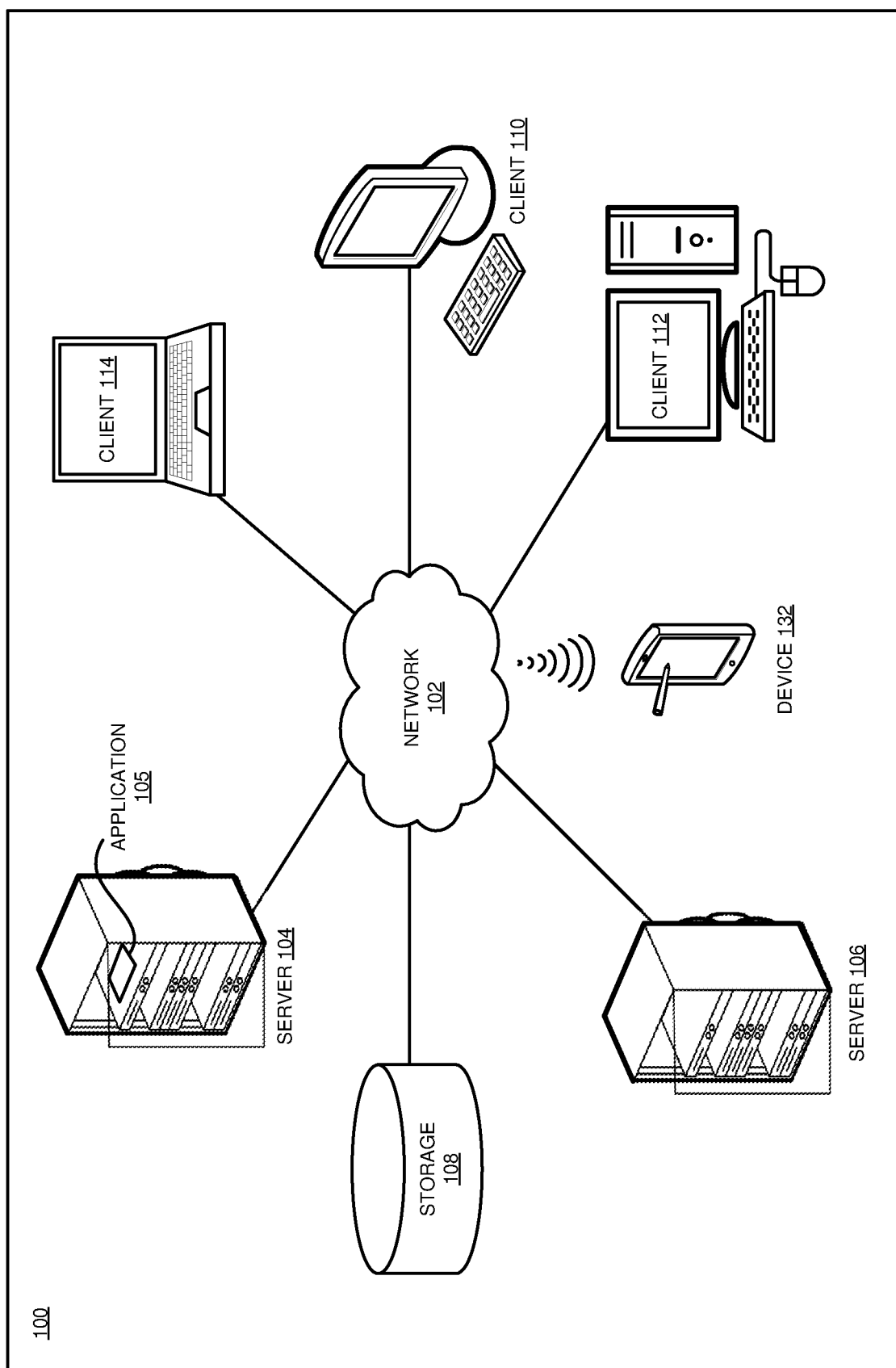
FIG. 1 depicts a block diagram of a network of data processing systems in which illustrative embodiments may be implemented.

The illustrative embodiments recognize that there is an unmet need for a system that automatically integrates code to generate log data into application source code, based on a particular type of software defect. The illustrative embodiments recognize that the presently available tools or solutions do not address these needs or provide adequate solutions for these needs. The illustrative embodiments used to describe the invention generally address and solve the above-described problems and other problems related to automated defect type based logging integration within source code.

An embodiment can be implemented as a software application. The application implementing an embodiment can be configured as a modification of an existing software development system, as a separate application that operates in conjunction with an existing software development system, a standalone application, or some combination thereof.

Particularly, some illustrative embodiments provide a method that uses a natural language processing model to process a historical defect report, identifies source code associated with the historical defect report, and generates, from the historical defect report and the source code, a logging rule comprising a defect type, logging placement information corresponding to the defect type, and logging format information corresponding to the defect type. The method determines that the logging rule applies to a new defect report reporting a defect in new source code, places logging source code within the new source code according to the logging rule, and causes execution of the new source code including the logging source code, generating the logging output.

Human software developers' previous logging code insertions, used to analyze previous defects, are a useful guide in generating logging code insertions to analyze a new defect. Thus, an embodiment analyzes one or more historical defect reports reporting on defects that human developers previously analyzed and fixed. A defect report is a description of a software defect. A defect report includes a structured data portion, a narrative text portion, or both. Non-limiting examples of data included in a structured data portion are a rating of the defect's severity (e.g. 1, 2, or 3) and a defect type selection (chosen from a fixed list of possibilities). Non-limiting examples of data included in a narrative text portion include a description of the defect. An embodiment uses a natural language processing model to parse narrative text of a defect report. If the defect report includes graphical material, such as a screenshot of a program's incorrect output, an embodiment uses a presently-available optical character recognition technique to convert textual portions of the screenshot to text before processing the text in a manner described herein.

An embodiment identifies a defect type within a historical defect report. One embodiment identifies a defect type within a structured data portion of a defect report. For example, a defect report might have a "defect type" section inviting a reporter to select a defect type from a list of possible types. Another embodiment identifies a defect type within a narrative text portion of a defect report, using a presently-available natural language processing model and presently-available natural language interpretation technique. For example, phrases such as "app froze", "application hangs when attempting to log in", and "word processor sat forever during spell check" all indicate a defect involving an unresponsive application.

An embodiment attempts to identify log data within a historical defect report. Some operating systems generate log data of particular system events, such as application becoming unresponsive or terminating unexpectedly, and optionally report this data to a defect repository. Some defect reporters include automatically-generated log data within a defect report, for use in reproducing, analyzing, and repairing the defect. As well, some developers include log data, either application-generated or developer-generated in the course of analyzing the defect, in defect reports for later use. To attempt to identify log data in unstructured text, an embodiment uses a presently-available natural language interpretation technique.

An embodiment identifies source code associated with a historical defect report. Sometimes the source code includes code that generates log data. One embodiment receives the source code along with a corresponding historical defect report. Another embodiment identifies the source code within a code repository. A code repository stores application source code, often of different versions of an application. The repository is either stored within the group's own network or is an Internet-based repository such as GitHub. (GitHub is a registered trademark of GitHub, Inc. in the United States and other countries.) To identify source code corresponding to a defect report, one embodiment uses links provided by some code repository implementations associating an application with defect reports regarding that application, or links associating particular versions of source code files with particular defect reports or other software defect information. To identify source code corresponding to a defect report, another embodiment analyzes notes supplied by a human developer when storing source code in the repository. For example, when accepting source code for storage a repository user interface might invite a developer to include a text description such as "fixed defect #12345" or "fixed freeze in login code".

An embodiment analyzes source code associated with a historical defect report using any presently available software parsing technique. Some non-limiting examples of results of the source code analysis are which source code files include particular code units such as functions and classes, where particular variables are read and written, and execution flows within the application, as well as any code statements used to generates log data generating code (also called logging code) and the context of any logging code within the application.

An embodiment generates a logging rule from the results of analyzing historical defect reports and associated source code. One embodiment analyzes multiple defect reports and source code, determines a pattern with above a threshold degree of confidence, and implements the pattern as a logging rule.

In one embodiment, the logging rule specifies a defect type to which the logging rule applies, logging code placement information, and logging format information. Logging code placement information specifies where in source code logging code should be inserted. For example, a logging rule might specify that for a defect type of an application no longer responding to input (i.e. hanging), logging code is to be placed at the entry point of every function to help a developer trace execution flow within the application and determine which function is executing when the application stops responding. Logging format information specifies a standard format for output generated by the logging code, to enforce consistency in the output. One embodiment includes a default logging rule applicable to all defect types or for use when a particular defect type could not be determined.

An embodiment applies a logging rule to a new defect report. In particular, an embodiment identifies a defect type within a structured data portion of a new defect report, a narrative text portion of the defect report, or both, in a manner described herein. An embodiment also identifies and analyzes source code associated with the new defect report in a manner described herein. An embodiment identifies a logging rule applicable to defects of the type reported in the new defect report and applies the logging rule by placing logging code, in the rule's specified format, according to the rule's placement information.

An embodiment causes conversion of source code of the application, including the inserted logging code, into an executable form, and causes execution of the modified application. The embodiment uses any presently available techniques for code conversion and execution, including compiling the code and then using a processor to execute the compiled code, and using an interpreter to convert source code to executable code and executing the interpreted code. The inserted logging code, when executed, generates logging output in a standardized format, automatically providing useful data for a human developer analyzing the defect reported in the new defect report.

An embodiment integrates source code of the application, including the inserted logging code, with the generated logging output for display to a human developer, providing source code, and corresponding logging data displaying an execution state of the source code, in an integrated display. Displaying source code and corresponding logging data together aids a human developer, especially one who is new to a particular set of source code, in analyzing both source code and the results of the code's execution, thus improving the developer's defect analysis and repair process.

The manner of automated defect type based logging integration within source code described herein is unavailable in the presently available methods in the technological field of endeavor pertaining to software development. A method of an embodiment described herein, when implemented to execute on a device or data processing system, comprises substantial advancement of the functionality of that device or data processing system in using a natural language processing model to process a historical defect report, identifying source code associated with the historical defect report, and generating, from the historical defect report and the source code, a logging rule comprising a defect type, logging placement information corresponding to the defect type, and logging format information corresponding to the defect type. The method determines that the logging rule applies to a new defect report reporting a defect in new source code, places logging source code within the new source code according to the logging rule, and causes execution of the new source code including the logging source code, generating the logging output.

The illustrative embodiments are described with respect to certain types of defect reports, logging output, source code features and constructs, logging rules, logging placement and format information, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
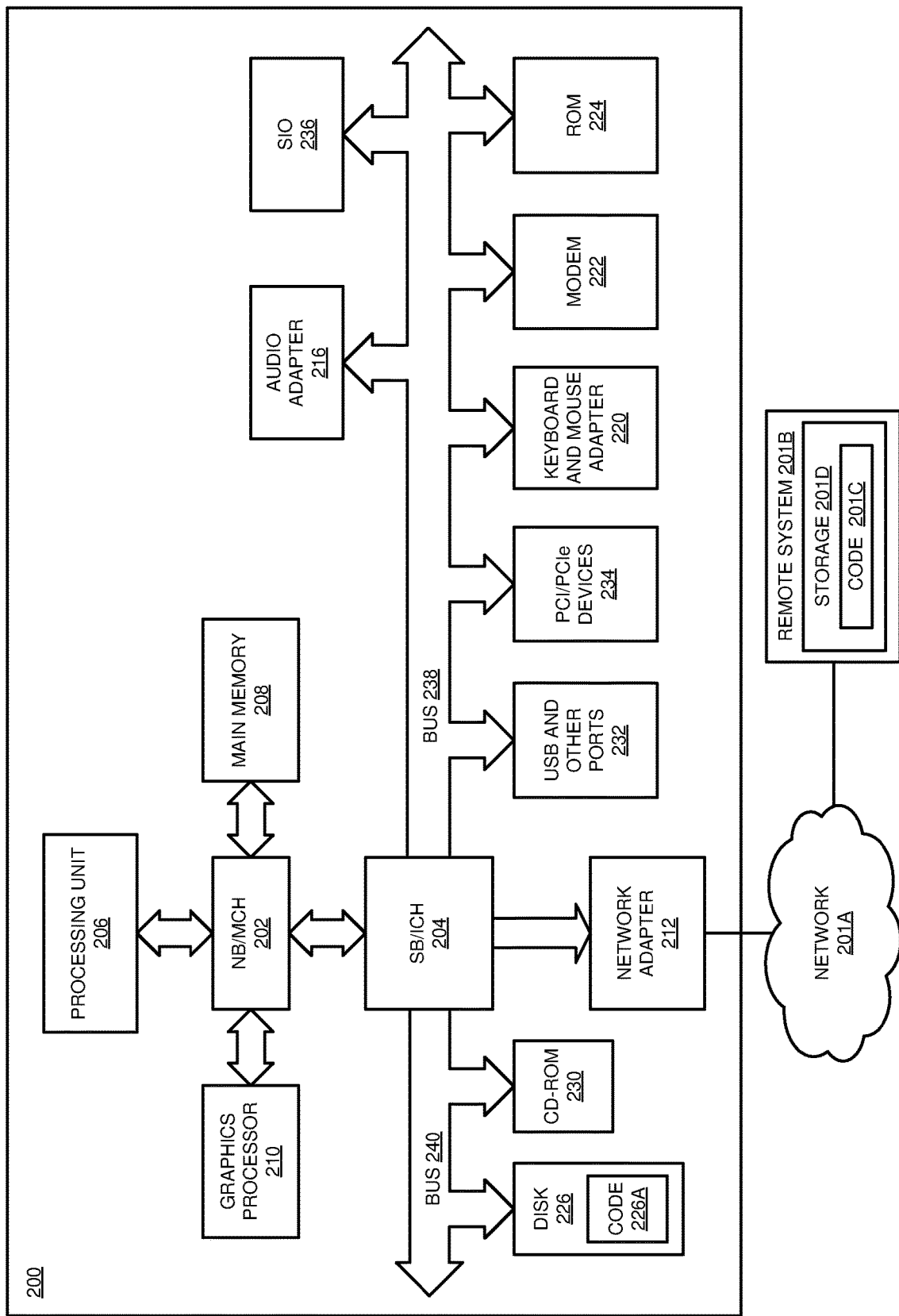
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
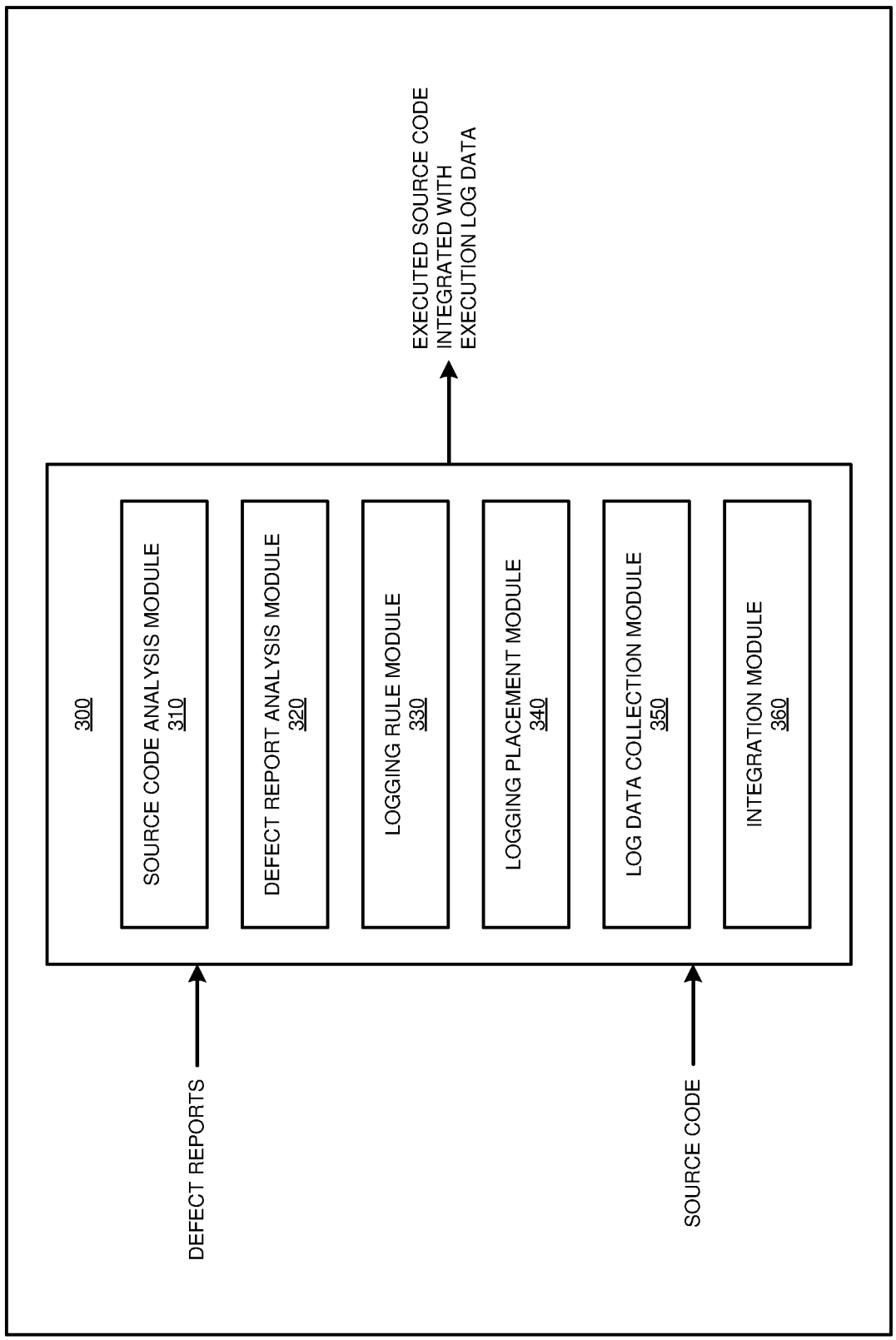
FIG. 3 depicts a block diagram of an example configuration for automated defect type based logging integration within source code in accordance with an illustrative embodiment.

With reference to FIG. 3, this figure depicts a block diagram of an example configuration for automated defect type based logging integration within source code in accordance with an illustrative embodiment. Application 300 is an example of application 105 in FIG. 1 and executes in any of servers 104 and 106, clients 110, 112, and 114, and device 132 in FIG. 1.

Defect report analysis module 320 analyzes one or more historical defect reports reporting on defects that human developers previously analyzed and fixed. Module 320 uses a natural language processing model to parse narrative text of a defect report. If the defect report includes graphical material, such as a screenshot of a program's incorrect output, module 320 uses a presently-available optical character recognition technique to convert textual portions of the screenshot to text before further processing the text.

Module 320 identifies a defect type within a historical defect report. One implementation of module 320 identifies a defect type within a structured data portion of a defect report. Another implementation of module 320 identifies a defect type within a narrative text portion of a defect report, using a presently-available natural language processing model and presently-available natural language interpretation technique.

Module 320 also attempts to identify log data within a historical defect report. To attempt to identify log data in unstructured text, module 320 uses a presently-available natural language interpretation technique.

Source code analysis module 310 identifies source code associated with a historical defect report. Sometimes the source code includes code that generates log data. One implementation of module 310 receives the source code along with a corresponding historical defect report analyzed by module 320. Another implementation of module 310 identifies the source code within a code repository. To identify source code corresponding to a defect report, one implementation of module 310 uses links provided by some code repository implementations associating an application with defect reports regarding that application, or links associating particular versions of source code files with particular defect reports or other software defect information. To identify source code corresponding to a defect report, another implementation of module 310 analyzes notes supplied by a human developer when storing source code in the repository. For example, when accepting source code for storage a repository user interface might invite a developer to include a text description such as "fixed defect #12345" or "fixed freeze in login code". Module 310 analyzes source code associated with a historical defect report using any presently available software parsing technique, generating example analysis results such as which source code files include particular code units such as functions and classes, where particular variables are read and written, and execution flows within the application, as well as any code statements used to generates log data generating code (also called logging code) and the context of any logging code within the application.

Logging rule module 330 generates a logging rule from the results of analyzing historical defect reports and associated source code. In one implementation of module 330, the logging rule specifies a defect type to which the logging rule applies, logging code placement information, and logging format information. One implementation of module 330 includes a default logging rule applicable to all defect types or for use when a particular defect type could not be determined.

Log data collection module 350 applies a logging rule to a new defect report. In particular, module 320 identifies a defect type within a structured data portion of a new defect report, a narrative text portion of the defect report, or both, in a manner described herein. Module 310 also identifies and analyzes source code associated with the new defect report in a manner described herein. Module 350 identifies a logging rule applicable to defects of the type reported in the new defect report and applies the logging rule by placing logging code, in the rule's specified format, according to the rule's placement information.

Application 300 causes conversion of source code of the application, including the inserted logging code, into an executable form, and causes execution of the modified application. Application 300 uses any presently available techniques for code conversion and execution, including compiling the code and then using a processor to execute the compiled code, and using an interpreter to convert source code to executable code and executing the interpreted code. The inserted logging code, when executed, generates logging output in a standardized format, automatically providing useful data for a human developer analyzing the defect reported in the new defect report.

Integration module 360 integrates source code of the application, including the inserted logging code, with the generated logging output for display to a human developer, providing source code, and corresponding logging data displaying an execution state of the source code, in an integrated display. Displaying source code and corresponding logging data together aids a human developer, especially one who is new to a particular set of source code, in analyzing both source code and the results of the code's execution, thus improving the developer's defect analysis and repair process.

Figure 4:
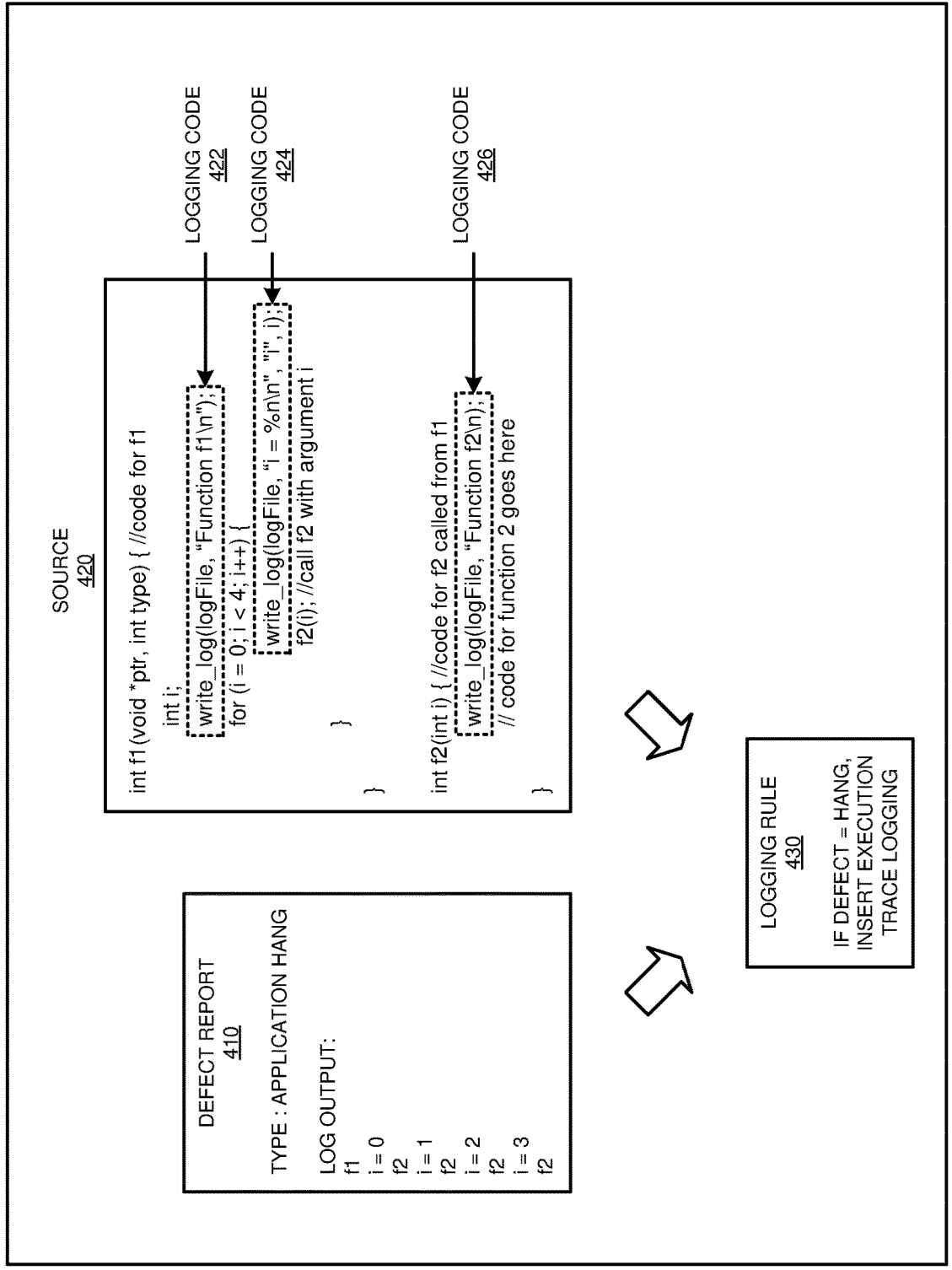
FIG. 4 depicts an example of automated defect type based logging integration within source code in accordance with an illustrative embodiment.

With reference to FIG. 4, this figure depicts an example of automated defect type based logging integration within source code in accordance with an illustrative embodiment. The example can be executed using application 300 in FIG. 3.

Defect report 410 is an example historical defect report, including a description of the defect type and example logging output. Source 420 is example source code associated with defect report 410. Source 420 includes logging code 422 (logging entry to function f1), logging code 424 (logging the current value of variable i), and logging code 426 (logging entry to function f2).

Application 300 identifies a defect type (the application hanging) within defect report 410, identifies log data within defect report 410, identifies source 420 as associated with defect report 410, analyzes the logging code 422, 424, and 426 in source 420, and generates logging rule 430 from the analysis results. Note that FIG. 4 depicts a simplified example, and in practice application 300 would likely analyze multiple defect reports and source code, determine a pattern with above a threshold degree of confidence, and implement the pattern as logging rule 430.

Figure 5:
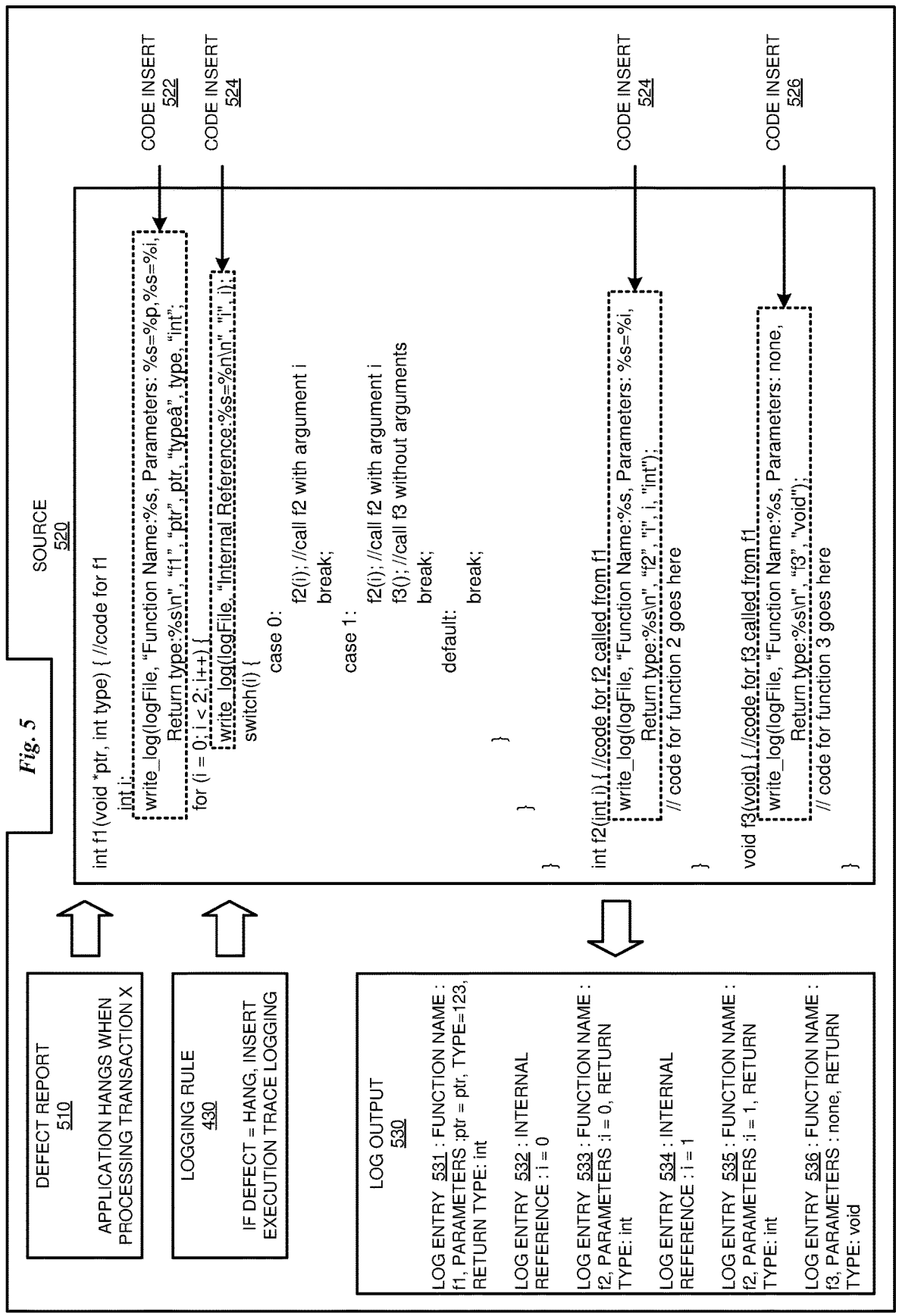
FIG. 5 depicts a continued example of automated defect type based logging integration within source code in accordance with an illustrative embodiment.

With reference to FIG. 5, this figure depicts a continued example of automated defect type based logging integration within source code in accordance with an illustrative embodiment. Logging rule 430 is the same as logging rule 430 in FIG. 4.

Defect report 510 is an example new defect report, including a description of the defect type. Note that defect report 510 does not include example logging output.

Application 300 identifies a defect type (the application hanging) within defect report 510 and identifies source 520 as associated with defect report 510, and applies logging rule 430. Following logging rule 420, application 300 places code insert 522 (logging entry to function f1), code insert 524 (logging the current value of variable i), code insert 526 (logging entry to function f2), and code insert 528 (logging entry to function f3). Source 520, including the code inserts, is executed, generating log output 530 including log entries 531, 532, 533, 534, 535, and 536. Note that the format of log output 530 is different from that generated and depicted with reference to FIG. 4, because application 300 has enforced a standard format for log output.

Figure 6:
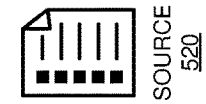
FIG. 6 depicts a continued example of automated defect type based logging integration within source code in accordance with an illustrative embodiment.

With reference to FIG. 6, this figure depicts a continued example of automated defect type based logging integration within source code in accordance with an illustrative embodiment. Source 520 (depicted in symbolic form), log output 530, and log entries 531, 532, 533, 534, 535, and 536 are the same as source 520, log output 530, and log entries 531, 532, 533, 534, 535, and 536 in FIG. 5.

Display 610 depicts a version of source 520, with logging code inserts replaced by log entries 531, 532, 533, 534, 535, and 536 in correct places within source 520, to aid a human developer in analyzing the execution of source 520 and analyzing the defect reported in defect report 510.

Figure 7:
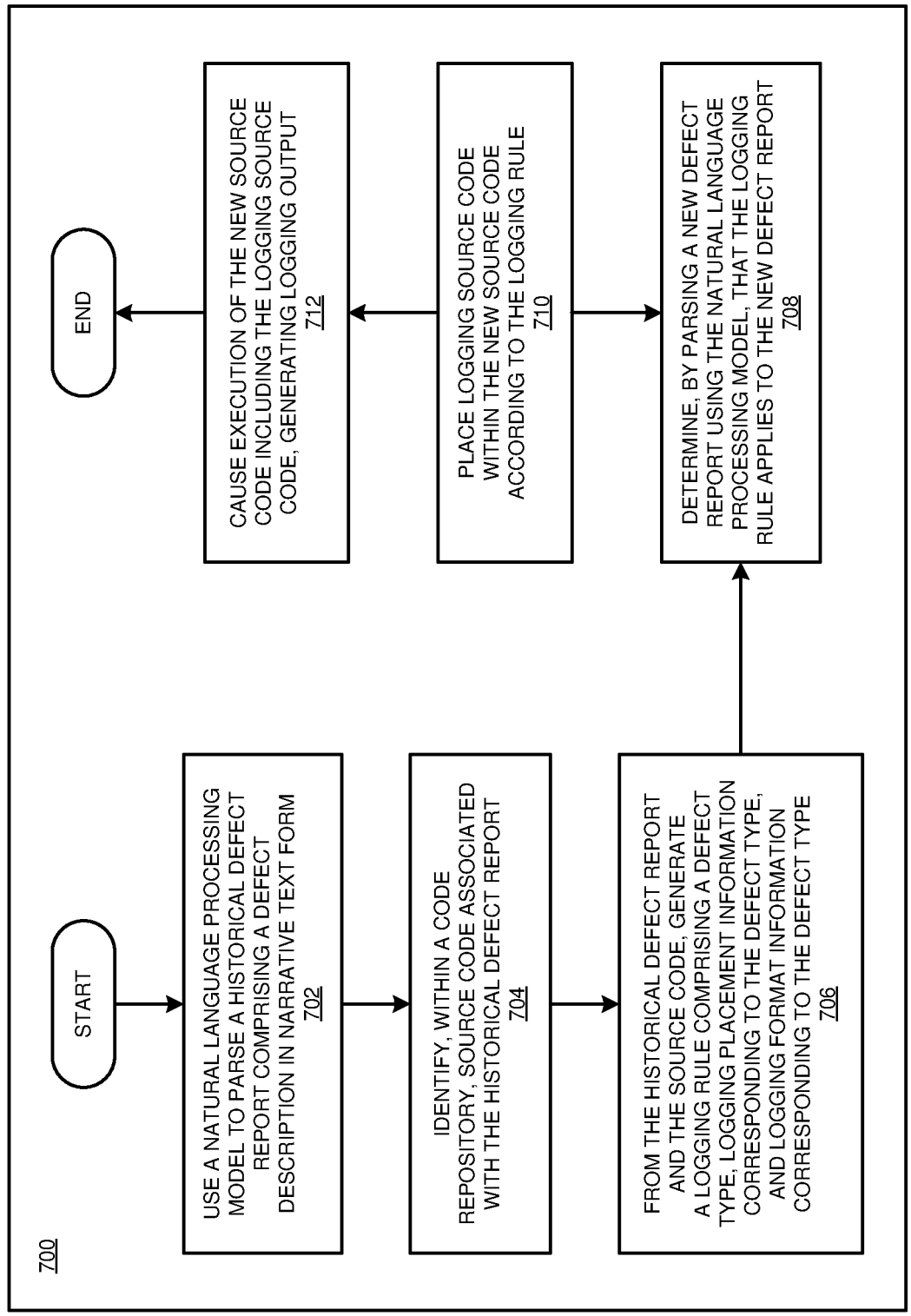
FIG. 7 depicts a flowchart of an example process for automated defect type based logging integration within source code in accordance with an illustrative embodiment.

With reference to FIG. 7, this figure depicts a flowchart of an example process for automated defect type based logging integration within source code in accordance with an illustrative embodiment. Process 800 can be implemented in application 300 in FIG. 3.

In block 702, the application uses a natural language processing model to parse a historical defect report comprising a defect description in narrative text form. In block 704, the application identifies, within a code repository, source code associated with the historical defect report. In block 706, the application, from the historical defect report and the source code, generates a logging rule comprising a defect type, logging placement information corresponding to the defect type, and logging format information corresponding to the defect type. In block 708, the application determines, by parsing a new defect report using the natural language processing model, that the logging rule applies to the new defect report. In block 710, the application places logging source code within the new source code according to the logging rule. In block 712, the application causes execution of the new source code including the logging source code, generating logging output. Then the application ends.

Figure 8:
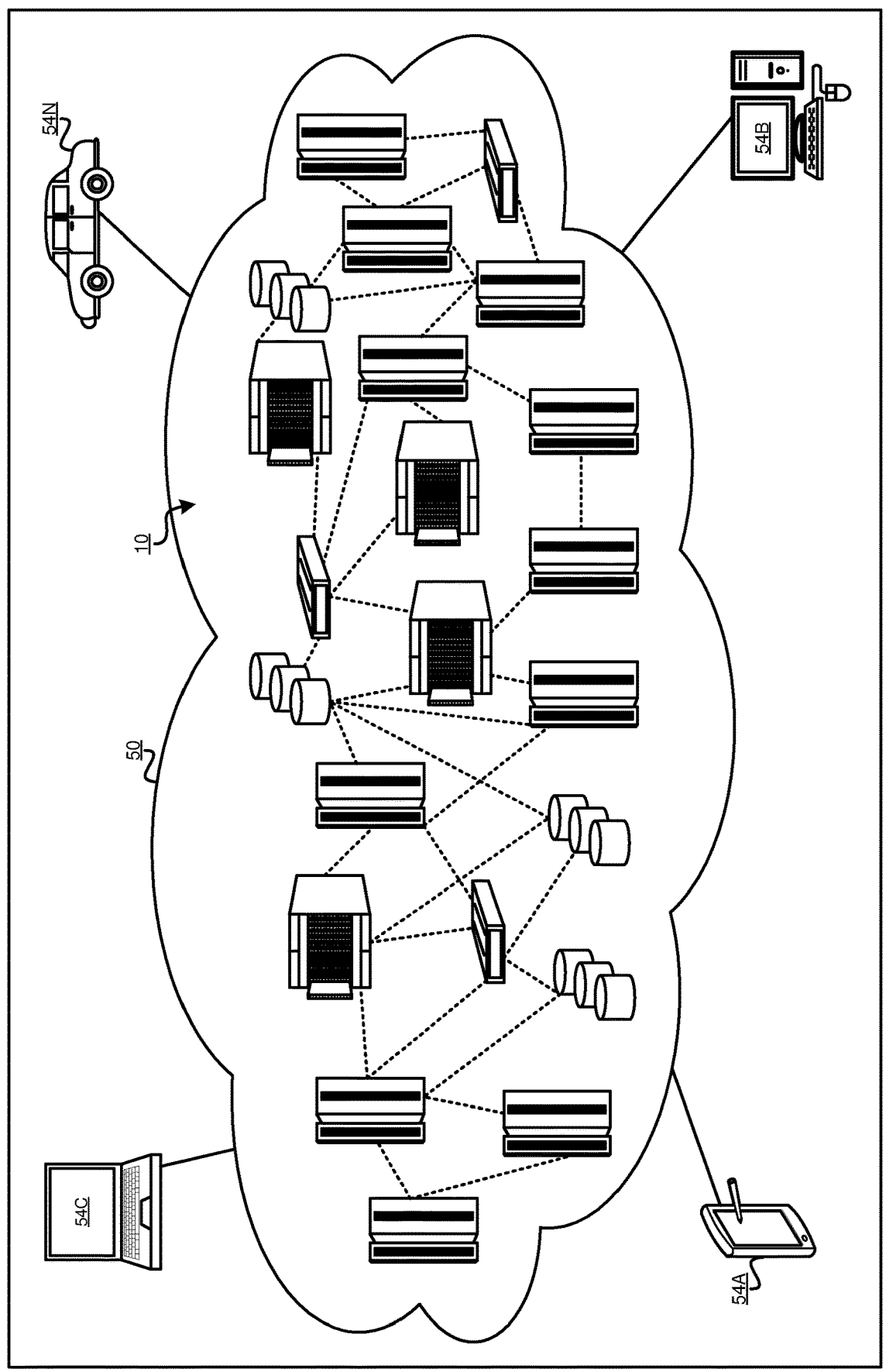
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
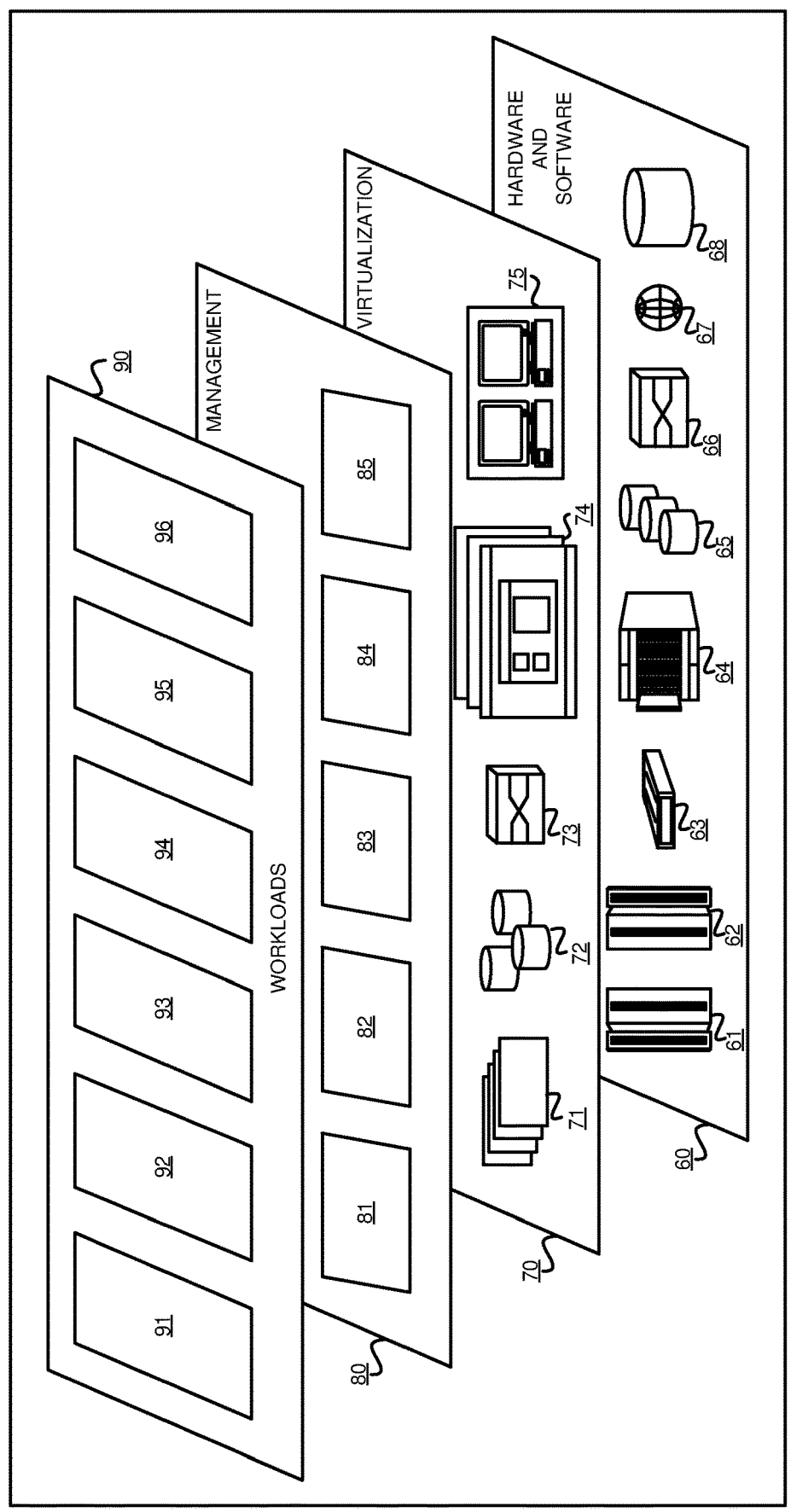
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for automated defect type based logging integration within source code and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:

parsing, using a natural language processing model, a historical defect report, the historical defect report comprising a defect description in narrative text form, the defect description comprising a previously implemented solution to a previously reported defect in a first application;

identifying, within a code repository, source code of the first application, wherein the source code of the first application is associated with the previously implemented solution described in the historical defect report;

generating, from the historical defect report and the source code, a logging rule, the logging rule comprising a defect type, logging placement information corresponding to the defect type, and logging format information corresponding to the defect type;

determining, by parsing a new defect report using the natural language processing model, the new defect report comprising a description of a second defect in a second application, that the logging rule applies to the new defect report;

placing, within source code of the second application according to the logging rule, logging source code, the logging source code generating logging output when executed; and causing execution of the second application including the logging source code, the execution generating the logging output.

2. The computer-implemented method of claim 1, wherein the source code of the first application associated with the previously implemented solution described in the historical defect report includes historical logging output generating source code.

3. The computer-implemented method of claim 1, further comprising:

identifying, within the historical defect report, historical log data.

4. The computer-implemented method of claim 1, further comprising:

identifying, within the historical defect report, the defect type.

5. The computer-implemented method of claim 1, further comprising:

identifying, within text corresponding to the source code, the defect type, the text corresponding to the source code stored in the code repository in narrative text form.

6. The computer-implemented method of claim 1, further comprising:

integrating, for display, the source code of the second application and the generated logging output.

7. A computer program product for automated logging integration, the computer program product comprising:

one or more computer readable storage media, and program instructions collectively stored on the one or more computer readable storage media, the program instructions comprising:

program instructions to parse, using a natural language processing model, a historical defect report, the historical defect report comprising a defect description in narrative text form, the defect description comprising a previously implemented solution to a previously reported defect in a first application;

program instructions to identify, within a code repository, source code of the first application, wherein the source code of the first application is associated with the previously implemented solution described in the historical defect report;

program instructions to generate, from the historical defect report and the source code, a logging rule, the logging rule comprising a defect type, logging placement information corresponding to the defect type, and logging format information corresponding to the defect type;

program instructions to determine, by parsing a new defect report using the natural language processing model, the new defect report comprising a description of a second a defect in a second application, that the logging rule applies to the new defect report;

program instructions to place, within source code of the second application according to the logging rule, logging source code, the logging source code generating logging output when executed; and program instructions to cause execution of the second application including the logging source code, the execution generating the logging output.

8. The computer program product of claim 7, wherein the source code of the first application associated with the previously implemented solution described in the historical defect report includes historical logging output generating source code.

9. The computer program product of claim 7, further comprising:
program instructions to identify, within the historical defect report, historical log data.

10. The computer program product of claim 7, further comprising:
program instructions to identify, within the historical defect report, the defect type.

11. The computer program product of claim 7, further comprising:
program instructions to identify, within text corresponding to the source code, the defect type, the text corresponding to the source code stored in the code repository in narrative text form.

12. The computer program product of claim 7, further comprising:
program instructions to integrate, for display, the source code of the second application and the generated logging output.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to parse, using a natural language processing model, a historical defect report, the historical defect report comprising a defect description in narrative text form, the defect description comprising a previously implemented solution to a previously reported defect in a first application;

program instructions to identify, within a code repository, source code of the first application, wherein the source code of the first application is associated with the previously implemented solution described in the historical defect report;

program instructions to generate, from the historical defect report and the source code, a logging rule, the logging rule comprising a defect type, logging placement information corresponding to the defect type, and logging format information corresponding to the defect type;

program instructions to determine, by parsing a new defect report using the natural language processing model, the new defect report comprising a description of a second a defect in a second application, that the logging rule applies to the new defect report;

program instructions to place, within source code of the second application according to the logging rule, logging source code, the logging source code generating logging output when executed; and program instructions to cause execution of the second application including the logging source code, the execution generating the logging output.

17. The computer system of claim 16, wherein the source code of the first application associated with the previously implemented solution described in the historical defect report includes historical logging output generating source code.

18. The computer system of claim 16, further comprising:
program instructions to identify, within the historical defect report, historical log data.

19. The computer system of claim 16, further comprising:
program instructions to identify, within the historical defect report, the defect type.

20. The computer system of claim 16, further comprising:
program instructions to identify, within text corresponding to the source code, the defect type, the text corresponding to the source code stored in the code repository in narrative text form.

* * * * *